US012694625B2

(12) United States Patent
Wang

(10) Patent No.: US 12,694,625 B2
(45) Date of Patent: Jul. 28, 2026

(54) IMAGE PROCESSING METHOD, ELECTRONIC DEVICE AND STORAGE MEDIUM FOR A LIVE-ACTION SHOOTING IMAGE

(71) Applicant: Lemon Inc., Grand Cayman (KY)

(72) Inventor: Quan Wang, Los Angeles, CA (US)

( * ) Notice: Subject to any disclaimer, the term of this patent is extended or adjusted under 35 U.S.C. 154(b) by 413 days.

(21) Appl. No.: 18/264,245

(22) PCT Filed: Jan. 25, 2022

(86) PCT No.: PCT/SG2022/050033
§ 371 (c)(1),
(2) Date: Aug. 3, 2023

(87) PCT Pub. No.: WO2022/169413
PCT Pub. Date: Aug. 11, 2022

(65) Prior Publication Data
US 2024/0221324 A1     Jul. 4, 2024

(30) Foreign Application Priority Data

Feb. 3, 2021    (CN) ......................... 202110152273.8

(51) Int. Cl.
*G06T 19/00*          (2011.01)
*G06T 3/02*           (2024.01)
(Continued)

(52) U.S. Cl.
CPC .............. *G06T 19/006* (2013.01); *G06T 3/02* (2024.01); *G06V 10/42* (2022.01); *G06V 10/44* (2022.01); *G06V 20/176* (2022.01)

(58) Field of Classification Search
None
See application file for complete search history.

(56) References Cited

U.S. PATENT DOCUMENTS

| | | | | |
|---|---|---|---|---|
| 9,342,930 B1* | 5/2016 | Kraft | ................... | G06Q 30/0261 |
| 2015/0154803 A1* | 6/2015 | Meier | ........................ | G06T 7/74 |
| | | | | 345/633 |
| 2019/0022492 A1* | 1/2019 | Takahashi | ............... | G06T 19/00 |

FOREIGN PATENT DOCUMENTS

| | | |
|---|---|---|
| CN | 108776771 A | 11/2018 |
| CN | 108985275 A | 12/2018 |

(Continued)

OTHER PUBLICATIONS

Intellectual Property Office of Singapore, International Search Report Issued in Application No. PCT/SG2022/050033, Jul. 4, 2022, WIPO, 15 pages.

(Continued)

*Primary Examiner* — Michael J Cobb
(74) *Attorney, Agent, or Firm* — Alleman Hall LLP

(57) ABSTRACT

Embodiments of the present disclosure provide an image processing method and apparatus, an electronic device, and a program product. The method includes: obtaining a live-action shooting image; determining a target object image in the live-action shooting image, where the target object image is an image containing a target object; acquiring a displaying object associated with the target object; determining, according to the target object image, a target displaying position of the displaying object in the live-action shooting image; and displaying the displaying object at the target displaying position in the live-action shooting image. According to the technical solution provided by the embodiments, an augmented reality display technology is used for directly displaying the displaying object associated with the target object; and reconstruction of a virtual model is no longer required, thereby saving computing resources, improving display efficiency, and enabling a user to obtain better interaction experience and visual experience.

14 Claims, 9 Drawing Sheets

(51) Int. Cl.
  *G06V 10/42*      (2022.01)
  *G06V 10/44*      (2022.01)
  *G06V 20/10*      (2022.01)

(56)                References Cited

FOREIGN PATENT DOCUMENTS

| CN | 110536479 A | 12/2019 |
| CN | 111311756 A | 6/2020 |
| CN | 111638797 A | 9/2020 |
| CN | 111640184 A | 9/2020 |
| CN | 111815781 A | 10/2020 |
| CN | 111882590 A | 11/2020 |
| CN | 111970557 A | 11/2020 |
| JP | H0898847 A | 4/1996 |

OTHER PUBLICATIONS

First Office Action for Chinese Application No. 202110152273.8, mailed on May 30, 2025, 28 pages.
Liu W., et al, "Learning to Match 2D Images and 3D LIDAR Point Clouds for Outdoor Augmented Reality," 2020 IEEE Conference on Virtual Reality and 3D User Interfaces Abstracts and Workshops (VRW))), 2020, 2 pages.
Wu X., et al., "Hybrid Hardware Tracking Positioning spatial information virtual and real matching allow" Geography and Geographic Information Science, 26, 2010. Contains English abstract on last page.

* cited by examiner 301          300

Terminal

IMAGE PROCESSING METHOD, ELECTRONIC DEVICE AND STORAGE MEDIUM FOR A LIVE-ACTION SHOOTING IMAGE

This application is a National Stage of International Application No. PCT/SG2022/050033, filed on Jan. 25, 2022, which claims priority to Chinese Patent Application No. 202110152273.8, filed on Feb. 3, 2021, both of the applications are hereby incorporated by reference in their entireties.

TECHNICAL FIELD

Embodiments of the present disclosure relate to the field of computers, and in particular, to an image processing method and apparatus, an electronic device, and a program product.

BACKGROUND

An augmented reality (AR) technology is a technology for integrating virtual information with the real world.

Performing information presentation by means of augmented reality has become a possible information presentation manner. In the prior art, displaying virtual objects associated with an object in a live-action by means of the augmented reality technology is common prior art. When displaying these virtual objects, it is often necessary to reconstruct them.

SUMMARY

In view of the above problems, embodiments of the present disclosure provide an image processing method and apparatus, an electronic device, and a program product.

In a first aspect, an embodiment of the present disclosure provides an image processing method, including:

obtaining a live-action shooting image;

determining a target object image in the live-action shooting image, where the target object image is an image containing a target object;

acquiring a displaying object associated with the target object;

determining, according to the target object image, a target displaying position of the displaying object in the live-action shooting image; and displaying the displaying object at the target displaying position in the live-action shooting image.

In a second aspect, an embodiment of the present disclosure provides an image processing apparatus, including:

a shooting and displaying module, configured to obtain a live-action shooting image;

a recognition processing module, configured to determine a target object image in the live-action shooting image, where the target object image is an image containing a target object;

the recognition processing module is further configured to acquire a displaying object associated with the target object, and determine, according to the target object image, a target displaying position of the displaying object in the live-action shooting image;

where the shooting and displaying module is further configured to display the displaying object at the target displaying position in the live-action shooting image.

In a third aspect, an embodiment of the present disclosure provides an electronic device, including: at least one processor and a memory;

where the memory stores computer execution instructions;

the at least one processor executes the computer execution instructions stored in the memory, causing the at least one processor to perform the image processing method of the first aspect and various possible designs of the first aspect.

In a fourth aspect, an embodiment of the present disclosure provides a computer readable storage medium, where the computer readable storage medium stores therein computer execution instructions, when the computer execution instructions are executed by a processor, the image processing method of the first aspect and various possible designs of the first aspect is implemented.

In a fifth aspect, an embodiment of the present disclosure provides a computer program product including computer instructions, where when the computer instructions are executed by a processor, the image processing method of the first aspect and various possible designs of the first aspect is implemented.

In a sixth aspect, an embodiment of the present disclosure provides a computer program, where when the computer program is executed by a processor, the image processing method of the first aspect and various possible designs of the first aspect is implemented.

Embodiments of the present disclosure provide an image processing method and apparatus, an electronic device, and a program product. The method includes: obtaining a live-action shooting image; determining a target object image in the live-action shooting image, where the target object image is an image containing a target object; acquiring a displaying object associated with the target object; determining, according to the target object image, a target displaying position of the displaying object in the live-action shooting image; and displaying the displaying object at the target displaying position in the live-action shooting image.

BRIEF DESCRIPTION OF DRAWINGS

To describe the technical solutions in the embodiments of the present disclosure or in the prior art more clearly, the drawings required for describing the embodiments or the prior art will be briefly introduced in the following. Obviously, the drawings in the following description show some embodiments of the present disclosure, other drawings may also be obtained according to these drawings without paying creative efforts.

DESCRIPTION OF EMBODIMENTS

Figure 1:
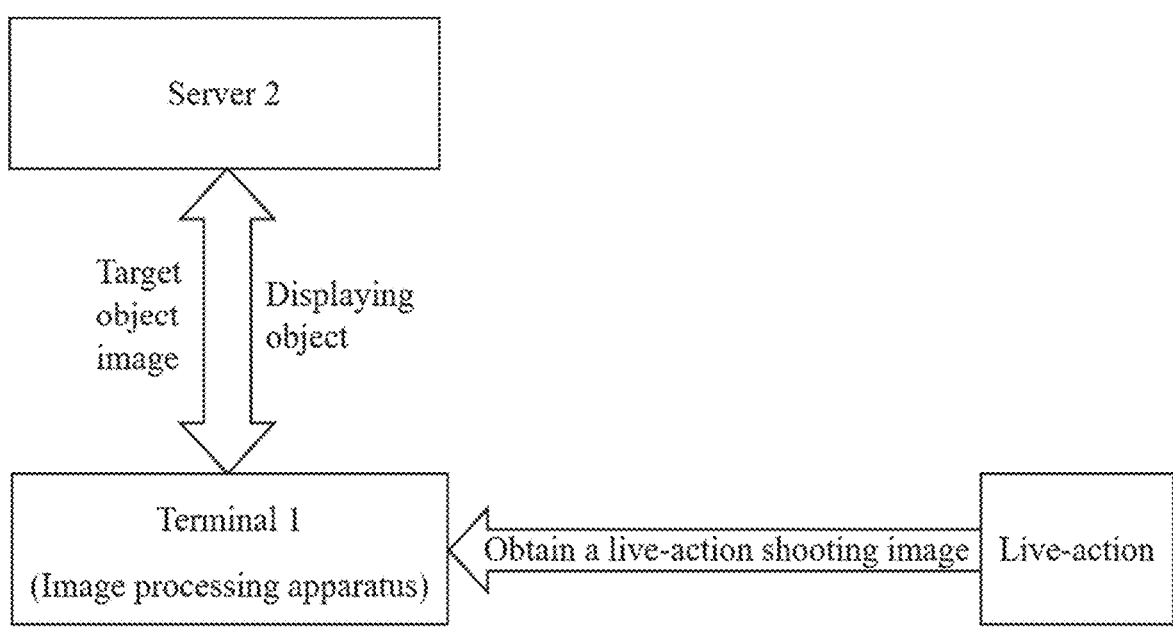
FIG. 1 is a schematic diagram of a network architecture on which the present disclosure is based.

In order to make objects, technical solutions and advantages of the embodiments of the present disclosure clearer, the technical solutions in the embodiments of the present disclosure will be described clearly and completely in combination with the drawings of the embodiments of the present disclosure. Apparently, the described embodiments are a part rather than all of the embodiments of the present disclosure. All other embodiments obtained by persons of ordinary skill in the art based on the embodiments of the present disclosure without paying creative efforts shall belong to the scope of protection of the present disclosure.

An augmented reality (AR) technology is a technology for integrating virtual information with the real world.

Performing information presentation by means of augmented reality has become a possible information presentation manner. In the prior art, when displaying by means of augmented reality, a terminal first shoots a live-action of a real-life scenario to obtain a current live-action shooting image. Then, by means of the augmented reality technology, a displaying object including virtual objects is superimposed on the live-action shooting image, and the superimposed picture is presented to a user.

When the virtual objects are displayed in a superimposed manner, it is first required to construct associated virtual objects based on the object in the live-action, and then display the displaying object on the live-action shooting image based on the constructed virtual objects.

In the prior art, virtual objects, including the three-dimensional virtual model, need to be generated and constructed at each display. The generation and construction process requires a large amount of computing resources and time, resulting in longer display time and lower display efficiency when displaying the displaying object.

In view of the above problems, the inventor has inventively discovered through research that a method having low technical costs can be adopted when presenting a displaying object associated with an object. According to the method of the embodiments of the present disclosure, the image recognition technology at the image level can be directly used to achieve the display of the displaying object in the live-action image.

Specifically, obtain a live-action shooting image; determine a target object image in the live-action shooting image, where the target object image is an image containing a target object; acquire a displaying object associated with the target object; determine, according to the target object image, a target displaying position of the displaying object in the live-action shooting image; and display the displaying object at the target displaying position in the live-action shooting image.

According to the technical solution provided by this embodiment, the displaying object associated with the target object is directly displayed by means of an augmented reality display technology; and reconstruction of a virtual model is no longer required, thereby saving computing resources, improving display efficiency, and enabling a user to obtain better interaction experience and visual experience.

Referring to FIG. 1, FIG. 1 is a schematic diagram of a network architecture on which the present disclosure is based. The network architecture shown in FIG. 1 can specifically include a terminal 1 and a server 2.

The terminal 1 may specifically be a hardware device, such as a user mobile phone, a smart home device, a tablet computer, or a wearable device, which may be used to shoot a live-action and present the shot live-action. An image processing apparatus, which is hardware or software configured to perform an image processing method of the present disclosure, can be integrated or installed in the terminal 1, and can provide a displaying page of augmented reality display for the terminal 1. Moreover, the terminal 1 displays, by means of a screen or a display component thereof, the displaying page of augmented reality display provided by the image processing apparatus to a user.

The server 2 can specifically be a server or a server cluster set in the cloud, and the server or the server cluster may store image data and displaying object data related to the image processing method provided by the present disclosure, or the like.

Specifically, when performing the image processing method provided by the present disclosure, the image processing apparatus may further interact with the server 2 by means of a network component of the terminal 1, acquire the image data and the displaying object data stored in the server 2, and perform corresponding processing and display.

The architecture shown in FIG. 1 can be applied to the field of information presentation, in other words, it can be used to present a displaying object associated with an object in live-actions of various scenarios.

By way of example, the image processing method provided by the present disclosure can be applied to a scenario based on augmented reality display. For example, in a display scenario in which a landmark building is combined with the augmented reality display technology to present "New Year (Spring Festival) greeting" or "Cheer for a certain place", a "landmark building" in the live-action can be recognized first, and then the displaying object associated with the "landmark building", including "New Year (Spring Festival) greeting" or "Cheer for a certain place", can be displayed in the live-action including the "landmark building". In this scenario, the display of a displaying object associated with the "landmark building", including "New Year (Spring Festival) greeting" or "Cheer for a certain place", can be achieved by means of the image processing method provided by the present disclosure.

For another example, in some "Simulation" games based on the augmented reality display technology, the image processing method provided by the present disclosure can be implemented to display the displaying object "farmland" associated with a farmland mark in the live-action in the "Simulation" ("Education") games in the live-action.

For still example, the image processing method provided by the present disclosure can also be applied to advertisement scenarios based on augmented reality display. For example, for some commodities or products, the image processing method provided by the present disclosure can be implemented to present displaying objects such as product comments or product introduction associated with the commodities, thereby providing more information about the commodities to a user, and enhancing the user experience.

In addition, in some daily life scenarios in which a shooting function is used, the image processing method provided by the present disclosure can also be used to display a displaying object, thereby presenting more information about the scenario to a user, and improving the user's interaction experience.

For further example, in scenarios such as "taking pictures", where a camera of a terminal needs to be turned on to perform live-action shooting, the image processing method provided by the present disclosure can be executed together, so as to complete the information presentation in various daily living scenarios.

In the following, the image processing method provided by the present disclosure will be further explained.

Figure 2:
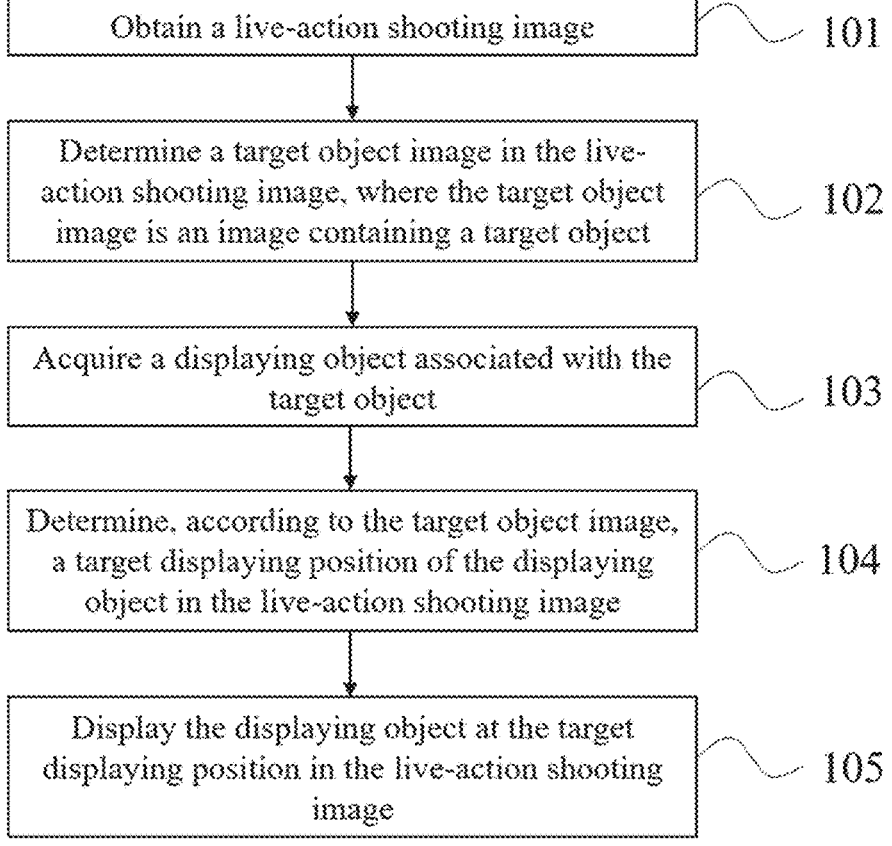
FIG. 2 is a schematic flowchart of an image processing method provided by an embodiment of the present disclosure.

In a first aspect, FIG. 2 is a schematic flowchart of an image processing method provided by an embodiment of the present disclosure. Referring to FIG. 2, the image processing method provided by the embodiment of the present disclosure includes:

Step 101, obtain a live-action shooting image;

Step 102, determine a target object image in the live-action shooting image, where the target object image is an image containing a target object;

Step 103, acquire a displaying object associated with the target object;

Step 104, determine, according to the target object image, a target displaying position of the displaying object in the live-action shooting image; and Step 105, display the displaying object at the target displaying position in the live-action shooting image.

It should be noted that, an execution subject of the processing method provided by this embodiment is an image processing apparatus. In some embodiments of the present disclosure, the execution subject specifically refers to a client or a display end that may be installed or integrated on a terminal. The user can operate the image processing apparatus through the terminal, so that the image processing apparatus can respond to an operation triggered by the user.

First, the terminal obtains a live-action shooting image, which may be an image obtained by the terminal invoking its own shooting component to shoot the current environment, or may be a real-time image of the live-action acquired by the image processing apparatus in other manners.

Subsequently, the terminal recognizes a target object in the live-action shooting image, so as to determine whether, in the live-action shooting image, there is a target object that can be used for performing the image processing method provided by the present disclosure, i.e., determine whether there is an image of a target object in the live-action shooting image.

Figure 3:
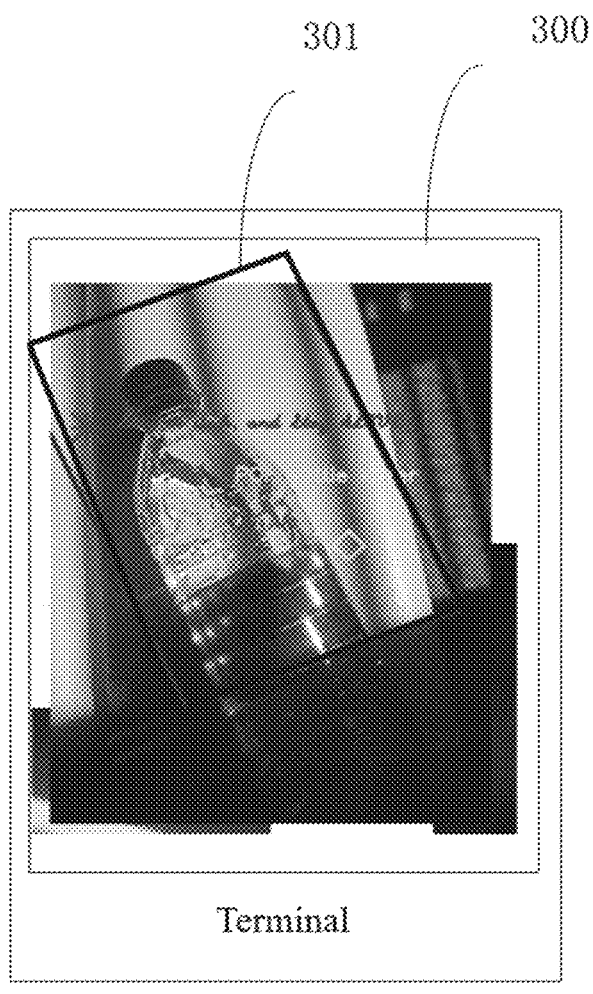
FIG. 3 is a schematic diagram of a first interface of an image processing method provided by an embodiment of the present disclosure.

FIG. 3 is a schematic diagram of a first interface of an image processing method provided by an embodiment of the present disclosure. In actual scenarios, the target object mentioned in the present disclosure may be any object that appears in the live-action, including but not limited to "landmark buildings", "commodities", "promotional QR codes", etc. in the aforementioned scenarios.

As shown in FIG. 3, the target object may be a "beverage bottle". By performing recognition processing on the live-action shooting image 300, it is determined that the live-action shooting image 300 includes a target object image 301 of the target object "beverage bottle".

In an optional implementation, when determining the target object, the terminal may perform feature matching on the feature(s) of the current live-action shooting image and the feature(s) of a reference image of the target object.

It should be noted that the reference image is generally an image that is preset in an image database of a server and includes a target object, and the reference image generally includes a standard image of the target object, such as a front view of a landmark building or a front view of a commodity, or an image containing all QR code information, etc.

Figure 4:
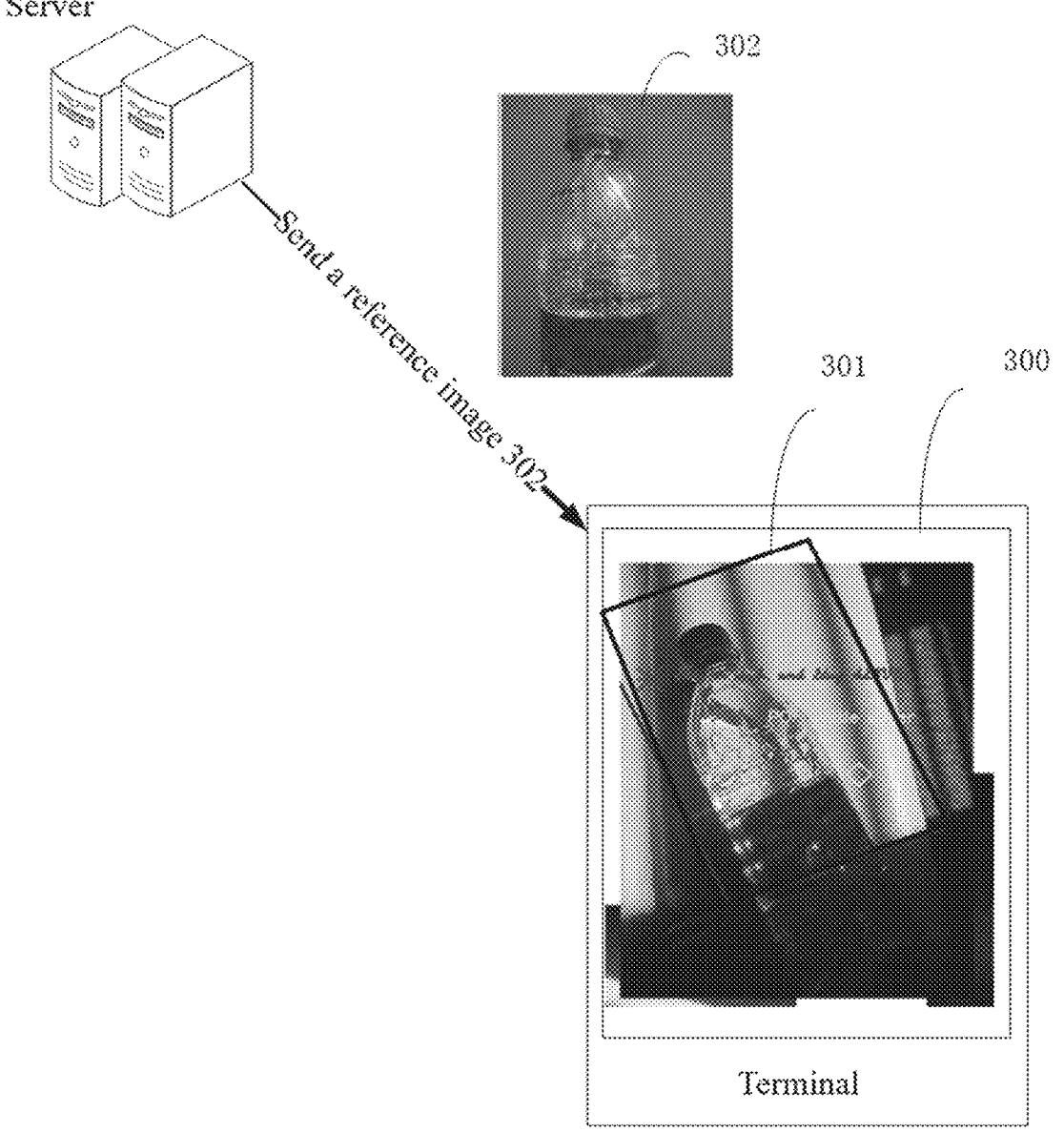
FIG. 4 is a schematic diagram of a second interface of an image processing method provided by an embodiment of the present disclosure.

FIG. 4 is a schematic diagram of a second interface of an image processing method provided by an embodiment of the present disclosure. Referring to FIG. 4, in order to determine a target object, it is first necessary to acquire an image containing the target object, i.e., a reference image 302. Then, the terminal can determine the target object image 301 in the live-action shooting image 300 based on the reference image 302.

For the image database of the server, a large number of to-be-referenced images of objects are generally stored therein, and all the to-be-referenced images are pre-stored in the image database.

In the embodiments provided by the present disclosure, in order to recognize the target object in the live-action shooting image, it is first necessary to find an image corresponding to the current live-action shooting image from a large number of to-be-referenced images stored in the image database as a reference image.

Optionally, this process can be achieved based on a feature matching manner. First, extract a global feature of the live-action shooting image; then, match the global feature of the live-action shooting image with a global feature of at least one to-be-referenced image stored in an image database; finally, determine a to-be-referenced image matched with the feature of the live-action shooting image as the reference image. In the embodiments of the present disclosure, the global feature of the live-action shooting image is extracted, and matching is performed by using the global feature so as to determine the reference image, thereby improving the matching degree with the live-action shooting image, and enhancing the user experience.

Specifically, the extraction of the global feature may be specifically implemented by using an existing machine learning model, such as a convolutional neural network. In order to recognize as much as possible whether, in the current live-action shooting image, there is a target object that can be used for executing the solution of the present disclosure, during recognition, the global feature(s) used for representing global information about an image or the global characteristic(s) of the image can be extracted from the live-action shooting image for subsequent matching.

Subsequently, in the process of matching the extracted global feature of the live-action shooting image with the global feature of the at least one to-be-referenced image stored in the image database, in order to increase matching efficiency, global features of respective reference images pre-stored in the image database can be pre-extracted and stored. After the global feature of the live-action shooting image is obtained, it is possible to perform matching processing of comparing the global feature with the pre-stored global features of the to-be-referenced images one by one. This matching processing includes, but is not limited to, feature comparison processing, image similarity calculation based on a distance between features, etc.

By means of this matching processing, a to-be-referenced image having the most similar global feature to the currently shot live-action shooting image can be found from the image database, and can be served as the reference image used in the current processing.

Figure 5:
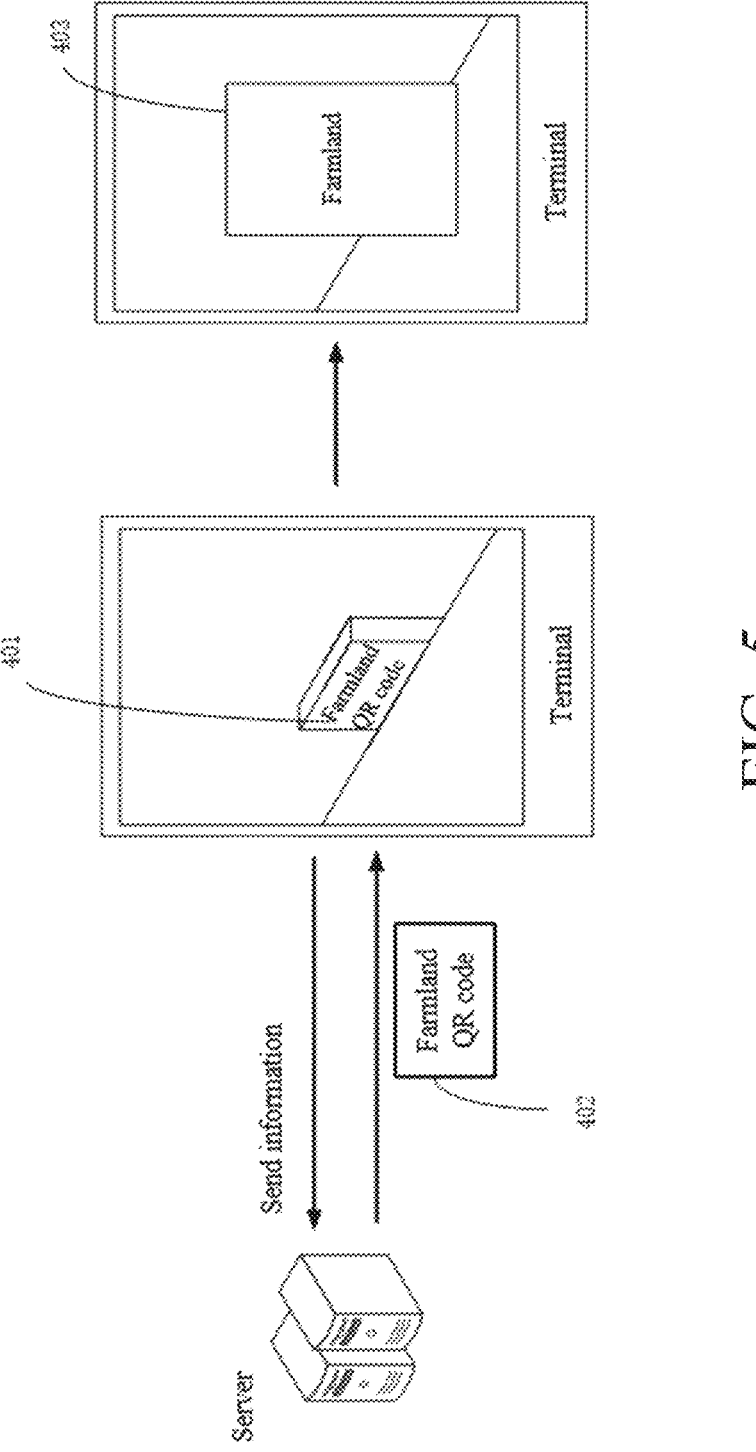
FIG. 5 is a schematic diagram of a third interface of an image processing method provided by an embodiment of the present disclosure.

FIG. 5 is a schematic diagram of a third interface of an image processing method provided by an embodiment of the present disclosure. Referring to FIG. 5, the server can determine, based on the information provided by the terminal, a reference image 402 corresponding to a "farmland QR code" at this position; then, the server sends the reference image 402 to the terminal, so that the terminal determines a target object image 401 of the "farmland QR code", and displays a "farmland" displaying object 403 corresponding to the "farmland QR code" on a screen of the terminal.

Certainly, in other optional implementations, the recognition process of the target object involved in the present disclosure can be implemented based on an existing recognition model, recognition component, or recognition server that can be used to recognize whether the target object is included in the image. The terminal can send the live-action shooting image to the recognition module, recognition component, or recognition server, and the corresponding recognition module, recognition component, or recognition server performs recognition processing to determine whether the target object is included in the live-action shooting image, and returns a processing result to the terminal.

In this manner, an image including a target object, i.e., a target object image, can be recognized from the live-action shooting image. After completing the determination of the target object image, the step of acquiring the displaying object associated with the target object is further executed.

The displaying object refers to a static object or a dynamic object that can be presented on the screen of the terminal, such as text information, image information, and a virtual special effect associated with the target object.

For example, in the foregoing scenario in which a landmark building is combined with the augmented reality display technology to present "New Year (Spring Festival) greeting" or "Cheer for a certain place", text information of greeting words or image information of the cheer can be used as a displaying object associated with the landmark building.

In an optional implementation, the acquiring of a displaying object can be achieved by means of interaction with the server, i.e., after completing the determination of the target object image, the terminal can upload the target object image to a server and receive the displaying object returned by the server so as to display the displaying object.

Specifically, the displaying object associated with the target object is generally preset, i.e., by establishing a mapping relationship between displaying objects and target objects in the server, in this way, when receiving a target object image including the target object, the server can send the corresponding displaying object of the target object to the terminal based on the mapping relationship for the terminal to display the displaying object.

In addition, in synchronization or asynchrony with the step of acquiring the displaying object by the terminal, the terminal further determines, according to the target object image, a target displaying position of the displaying object in the live-action shooting image, which can be specifically implemented through Steps 1041 and 1042:

Step 1041: perform model adaptation on the target object image and the reference image;

Step 1042: determine the target displaying position of the displaying object in the live-action shooting image based on a preset displaying position in the reference image.

The reference image includes a preset displaying position. The target displaying position of the displaying object in the live-action shooting image is determined by means of model adaption, thereby avoiding the inappropriate display of the displaying object in the live-action shooting image and improving the display effect of the displaying object in the live-action shooting image.

When displaying a displaying object, it is not only necessary to acquire the object content of the displaying object, but also to determine at which position in the live-action shooting image the displaying object is displayed.

Based on this, when configuring an associated displaying object for a target object, a corresponding preset displaying position may also be configured for the displaying object. For better image positioning, the preset displaying position can be carried in a reference image, so as to be acquired and processed by the terminal.

Figure 6:
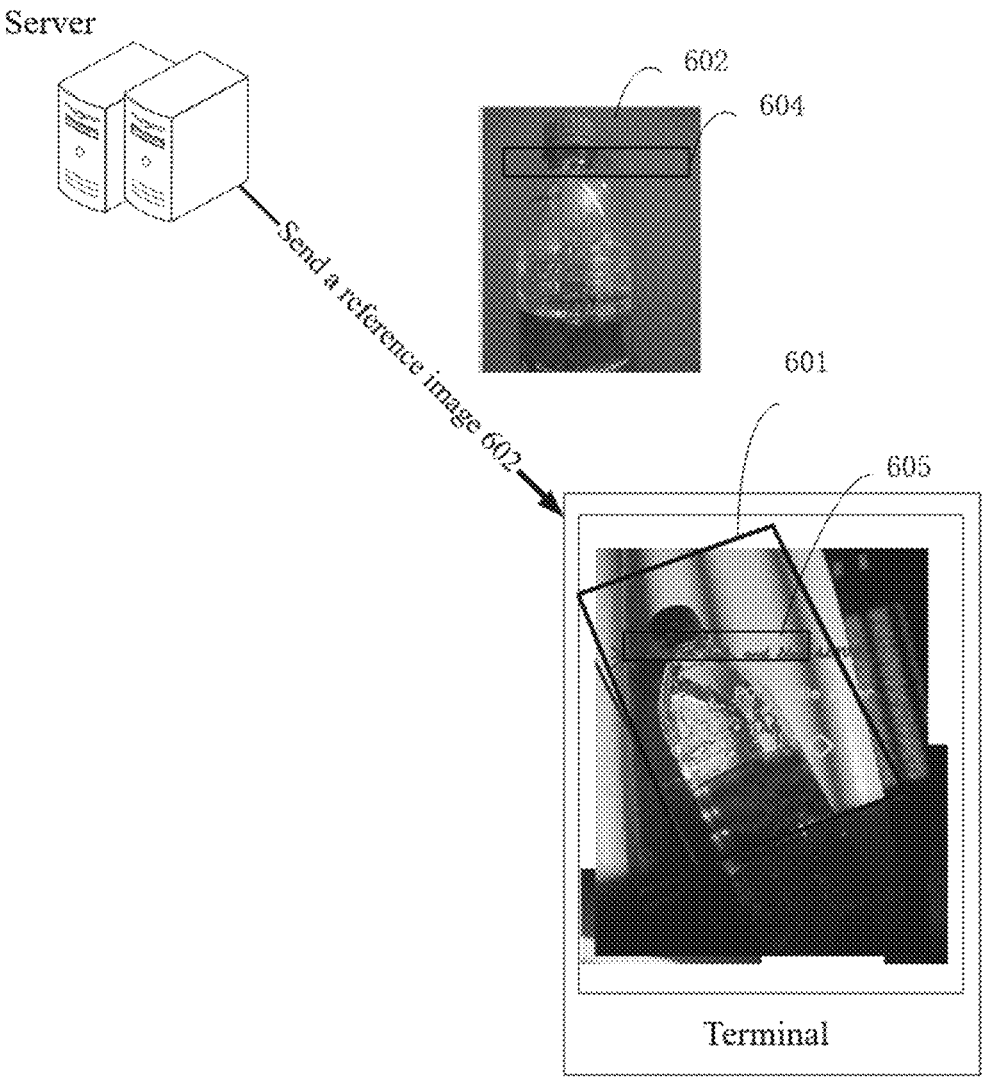
FIG. 6 is a schematic diagram of a fourth interface of an image processing method provided by an embodiment of the present disclosure.

Specifically, FIG. 6 is a schematic diagram of a fourth interface of an image processing method provided by an embodiment of the present disclosure. As mentioned above, the reference image includes an image containing all information of the target object. In combination with FIG. 6, the reference image 602 further includes a preset displaying position 604, which is used for indicating a displaying position of a displaying object associated with the target object in the reference image 602. By performing model adaptation on the target object image 601 and the reference image 602, a target displaying position 605 of the displaying object in the live-action shooting image is determined based on the preset displaying position 604 in the reference image 602.

The model adaptation on the image in Step 1041 can be implemented by means of feature matching of images.

First, the terminal can determine, according to the reference image and the target object image, an image affine transformation matrix.

The affine transformation matrix can be acquired in various manners. In an optional implementation, the affine transformation matrix can be implemented by means of an image feature matching technology: first, extract a local feature of the target object image; match the local feature of the target object image with a local feature of the reference image, to obtain a mapping relationship between the local features; and determine, according to the mapping relationship between the local features, the image affine transformation matrix.

Similar to the foregoing description, the extraction of the local feature may be specifically implemented by using an existing machine learning model, such as a convolutional neural network. Different from the foregoing description, in a process of determining the image affine variation matrix, in order to recognize a feature correspondence between a target object image and a reference image as much as possible, the local feature(s) of the target object image used for representing local information of the image or the local characteristic(s) of the image can be extracted during feature extraction for subsequent matching.

In an optional implementation, the local features of the target object image and the reference image may be highly robust SIFT (Distinctive Image Features from Scale Invariant Keypoints) features, which can have a data dimension of 128 dimensions.

In an optional implementation, the matching and mapping relationship between the local features of the target object image and the reference image can be acquired by using a nearest-neighbor search manner based on brute force/linear scan. The selection of the distance between matching features can be implemented based on a standard L2 Euclidean Distance, i.e., the distance of the currently closest matching feature points is smaller than the distance of the previous matching feature points by a ratio.

In an optional implementation, after obtaining the above mapping relationship, an affine matrix between images is established based on the mapping relationship, i.e., using RanSac's framework, an image affine transformation matrix is obtained by means of random sampling and multiple cycles. It can be determined that the target object image can be obtained by performing point multiplication on the reference image and the image affine transformation matrix.

Correspondingly, in Step 1042, the terminal further performs, according to the image affine transformation matrix, affine transformation on the preset displaying position in the reference image, to obtain the target displaying position of the displaying object in the live-action shooting image.

Figure 7:
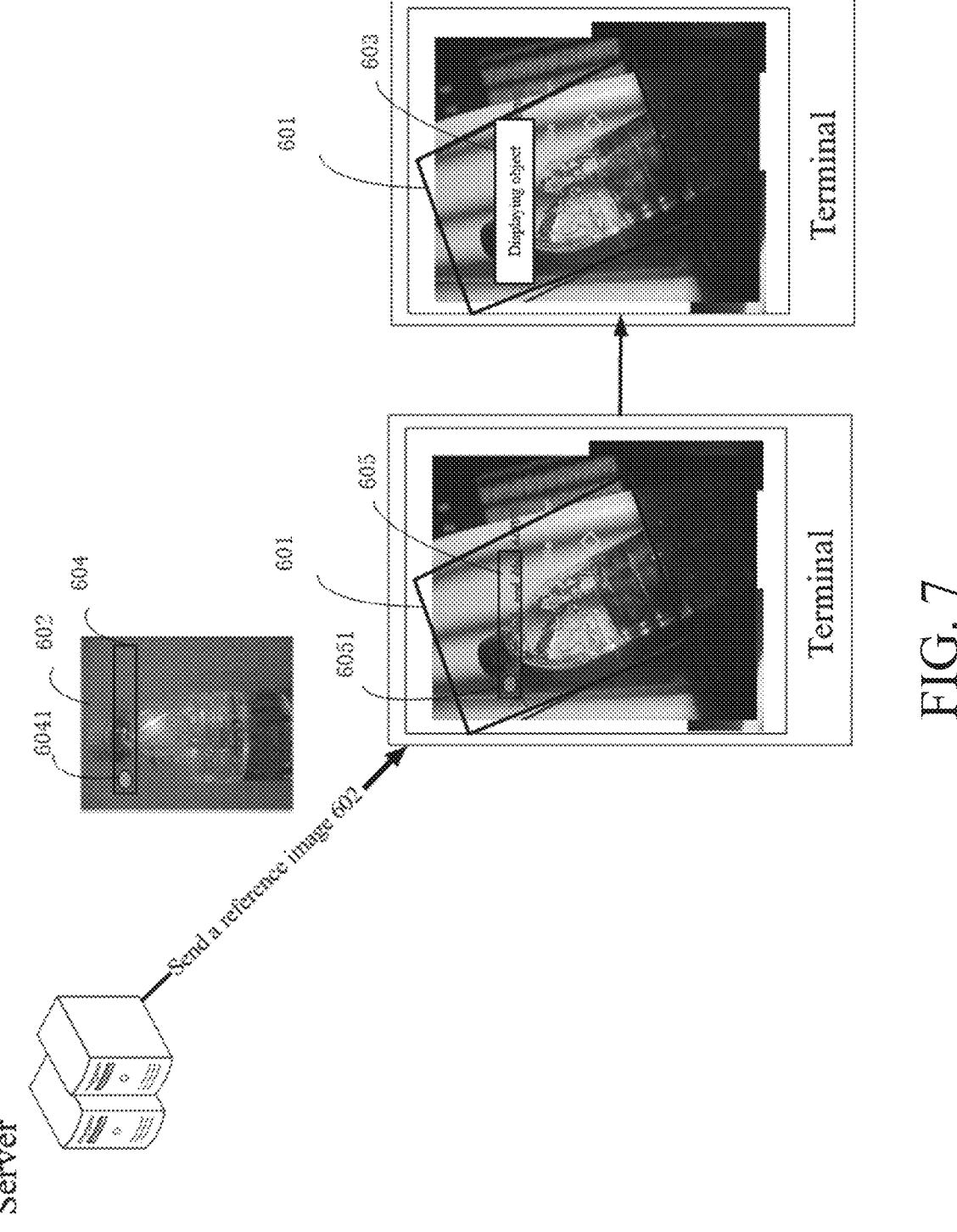
FIG. 7 is a schematic diagram of a fifth interface of an image processing method provided by an embodiment of the present disclosure.

When determining the target displaying position of the displaying object in the live-action shooting image, in order to reduce the amount of calculation, a reference coordinate point can be adopted. FIG. 7 is a schematic diagram of a fifth interface of an image processing method provided by an embodiment of the present disclosure. As shown in FIG. 7, the reference image can include a reference coordinate point 6041 of the preset displaying position.

Perform affine transformation according to the image affine transformation matrix on the reference coordinate point 6041, to obtain a transformed target reference coordinate point 6051; then, determine, according to the target reference coordinate point 6051, a target displaying position 605 of the displaying object 603 in the live-action shooting image. The reference coordinate point 6041 of the preset displaying position 604 being included in the reference image 602 is preset.

Finally, the terminal displays the displaying object at the target displaying position in the live-action shooting image. The image processing apparatus can display, based on the augmented reality display technology, the displaying object in a superimposition manner at the target displaying position in the live-action shooting image, thereby facilitating perfect combination of a displaying object and a live-action, improving interaction experience, and increasing display richness.

In addition, in other optional implementations, in order to provide a user with more interactive experience, the terminal can also respond to a triggering operation by a user on the displaying object displayed in the live-action shooting image, and display a triggering result of the displaying object in the live-action shooting image.

In different scenarios, as the displaying objects are different, there will be different triggering results according to the actual scenarios.

For example, in the "Simulation" game, when the displaying object "farmland" is displayed in the live-action image, a user can trigger an operation of "harvesting agricultural products", so that the trigger result of "completing harvest" can be displayed on the screen; alternatively, the user can trigger an operation of "visiting friends' farmland", so that the triggering result of "friends' farmland" can be displayed on the screen.

The above examples are only exemplary. According to actual application scenarios and actual service requirements, there should be more implementable manners in combination with the present disclosure, which is not limited in the present disclosure.

In order to further describe the image processing method provided by the present disclosure, the solution provided by the present disclosure will be described in detail below by taking a scenario in which a landmark building is combined with the augmented reality display technology to present "New Year (Spring Festival) greeting" as an example. In this embodiment, the target object is a landmark building.

Figure 8:
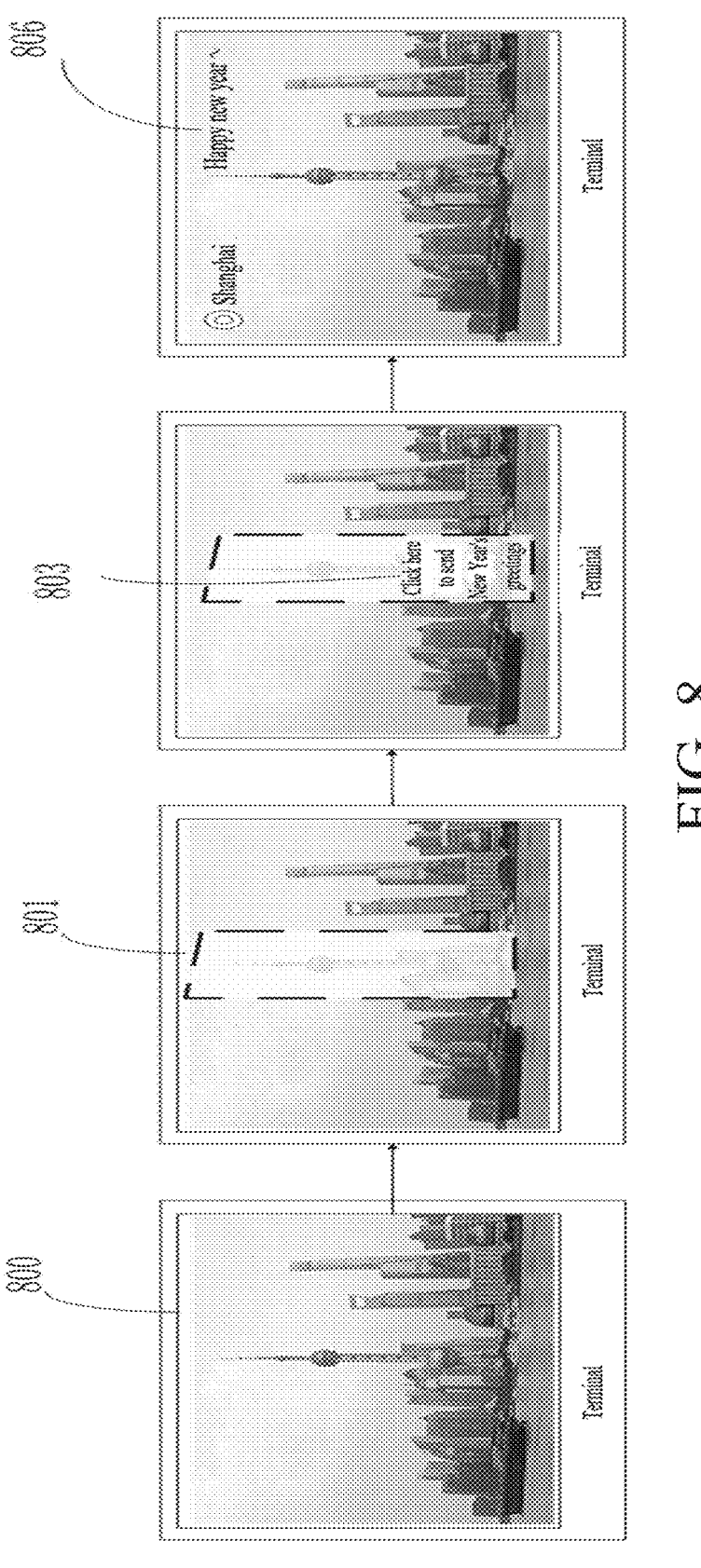
FIG. 8 is a schematic diagram of a sixth interface of an image processing method provided by an embodiment of the present disclosure.

FIG. 8 is a schematic diagram of a sixth interface of an image processing method provided by an embodiment of the present disclosure. As shown in FIG. 8, a user can trigger a shooting function of a terminal to cause the terminal to invoke a shooting component to obtain a live-action shooting image 800. The terminal can determine a target object image 801 of a target object "landmark building" in the live-action shooting image 800.

By means of the processing method provided by the described embodiments, in a live-action shooting image 800, display a displaying object 803 associated with a target object, i.e., "Click here to send New Year's greetings" in the figure.

Alternatively, referring to FIG. 8, an operation result 806 of triggering the displaying object 803 can be further displayed in the live-action shooting image 800. Optionally, the corresponding landmark name can also be displayed in the live-action shooting image 800, such as Shanghai shown in FIG. 8.

Embodiments of the present disclosure provide an image processing method. The method includes: obtaining a live-action shooting image; determining a target object image in the live-action shooting image, where the target object image is an image containing a target object; acquiring a displaying object associated with the target object; determining, according to the target object image, a target displaying position of the displaying object in the live-action shooting image; and displaying the displaying object at the target displaying position in the live-action shooting image. According to the technical solution provided by the embodiments, the displaying object associated with the target object is directly displayed by means of an augmented reality display technology; and reconstruction of a virtual model is no longer required, thereby saving computing resources, improving display efficiency, and enabling a user to obtain better interaction experience and visual experience.

Figure 9:
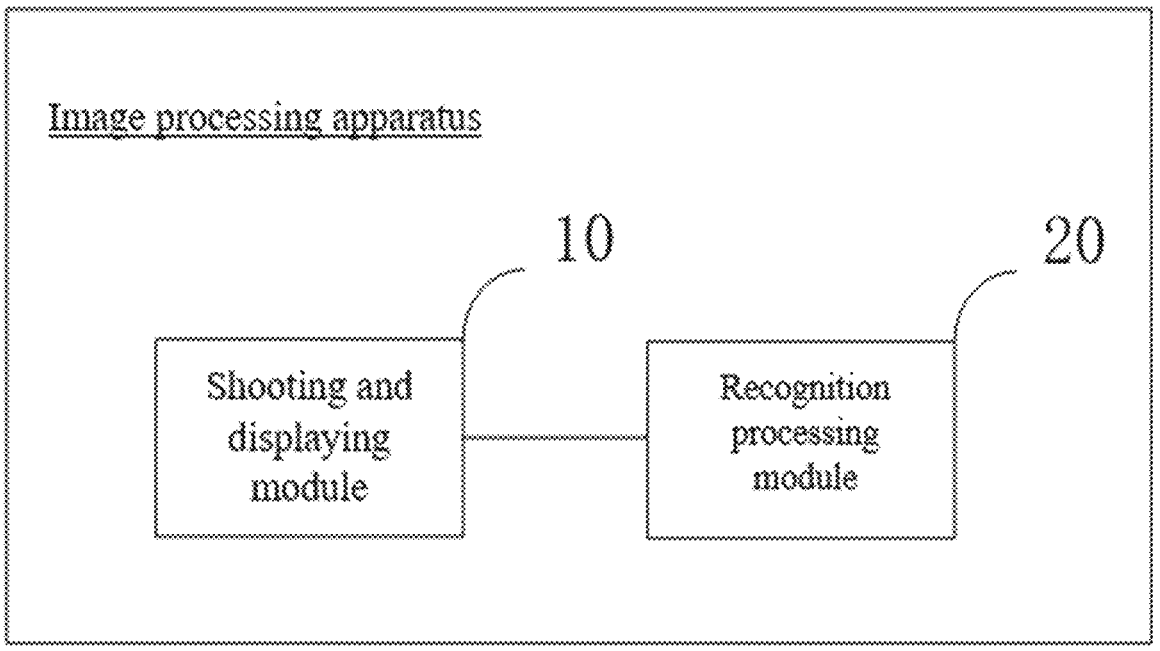
FIG. 9 is a structural block diagram of an image processing apparatus provided by an embodiment of the present disclosure.

Corresponding to the image processing method of the aforementioned embodiments, FIG. 9 is a structural block diagram of an image processing apparatus provided by an embodiment of the present disclosure. For illustrative purposes, only parts related to the embodiments of the present disclosure are shown. Referring to FIG. 9, an image processing apparatus includes: a shooting and displaying module 10 and a recognition processing module 20.

The shooting and displaying module 10 is configured to obtain a live-action shooting image.

The recognition processing module 20 is configured to determine a target object image in the live-action shooting image, where the target object image is an image containing a target object; the recognition processing module 20 is further configured to acquire a displaying object associated with the target object, and determine, according to the target object image, a target displaying position of the displaying object in the live-action shooting image.

The shooting and displaying module 10 is further configured to display the displaying object at the target displaying position in the live-action shooting image.

In an optional implementation, when determining the target object image in the live-action shooting image, the recognition processing module 20 is specifically configured to: acquire a reference image, where the reference image is the image containing the target object; and determine, according to the reference image, the target displaying object in the live-action shooting image.

In an optional implementation, when obtaining the reference image, the recognition processing module 20 is specifically configured to: extract a global feature of the live-action shooting image; match the global feature of the live-action shooting image with a global feature of at least one to-be-referenced image stored in an image database; and determine a to-be-referenced image matched with the global feature of the live-action shooting image as the reference image.

In an optional implementation, the reference image includes a preset displaying position;

when determining, according to the target object image, a target displaying position of the displaying object in the live-action shooting image, the recognition processing module 20 is specifically configured to: perform model adaptation on the target object image and the reference image, to determine the target displaying position of the displaying object in the live-action shooting image based on a preset displaying position in the reference image.

In an optional implementation, when performing model adaptation on the target object image and the reference image, to determine the target displaying position of the displaying object in the live-action shooting image based on a preset displaying position in the reference image, the recognition processing module 20 is specifically configured to: determine, according to the reference image and the target object image, an image affine transformation matrix; and perform, according to the image affine transformation matrix, affine transformation on the preset displaying position in the reference image, to obtain the target displaying position of the displaying object in the live-action shooting image.

In an optional implementation, when determining, according to the reference image and the target object image, an image affine transformation matrix, the recognition processing module 20 is specifically configured to:

extract a local feature of the target object image; match the local feature of the target object image with a local feature of the reference image, to obtain a mapping relationship between the local features; and determine, according to the mapping relationship between local features, the image affine transformation matrix.

In an optional implementation, the reference image includes a reference coordinate point of the preset displaying position;

when performing, according to the image affine transformation matrix, affine transformation on the preset displaying position in the reference image, to obtain the target displaying position of the displaying object in the live-action shooting image, the recognition processing module 20 is specifically configured to:

perform, according to the image affine transformation matrix, affine transformation on the reference coordinate point, to obtain a transformed target reference coordinate point; and determine, according to the target reference coordinate point, the target displaying position of the displaying object in the live-action shooting image.

In an optional implementation, the reference coordinate point of the preset displaying position being included in the reference image is preset.

In an optional implementation, after determining a target object image in the live-action shooting image, the recognition processing module 20 is further configured to: upload the target object image to a server; and receive the displaying object returned by the server so as to cause the shooting and displaying module 10 to display the displaying object.

In an optional implementation, when displaying the displaying object at the target displaying position in the live-action shooting image, the shooting and displaying module 10 is further configured to:

based on an augmented reality display technology, display the displaying object, in a superimposition manner, at the target displaying position in the live-action shooting image.

In an optional implementation, the shooting and displaying module 10 is further configured to: respond to a triggering operation by a user on the displaying object displayed in the live-action shooting image; and display a triggering result of the displaying object in the live-action shooting image.

In an optional implementation, the target object is a landmark building.

In an optional implementation, the shooting and displaying module 10 is further configured to display a landmark name of the landmark building in the live-action shooting image.

According to the image processing apparatus provided by the embodiments of the present disclosure, a live-action shooting image is obtained; a target object image is determined in the live-action shooting image, where the target object image is an image containing a target object; a displaying object associated with the target object is obtained; a target displaying position of the displaying object in the live-action shooting image is determined according to the target object image; and the displaying object is displayed at the target displaying position in the live-action shooting image. According to the technical solution provided by this embodiment, the displaying object associated with the target object is directly displayed by means of an augmented reality display technology; and reconstruction of a virtual model is no longer required, thereby saving computing resources, improving display efficiency, and enabling a user to obtain better interaction experience and visual experience.

The electronic device provided by this embodiment may be used to execute the technical solution of the foregoing method embodiments, its implementation principle and technical effects are similar, and are not repeatedly described herein in this embodiment.

Figure 10:
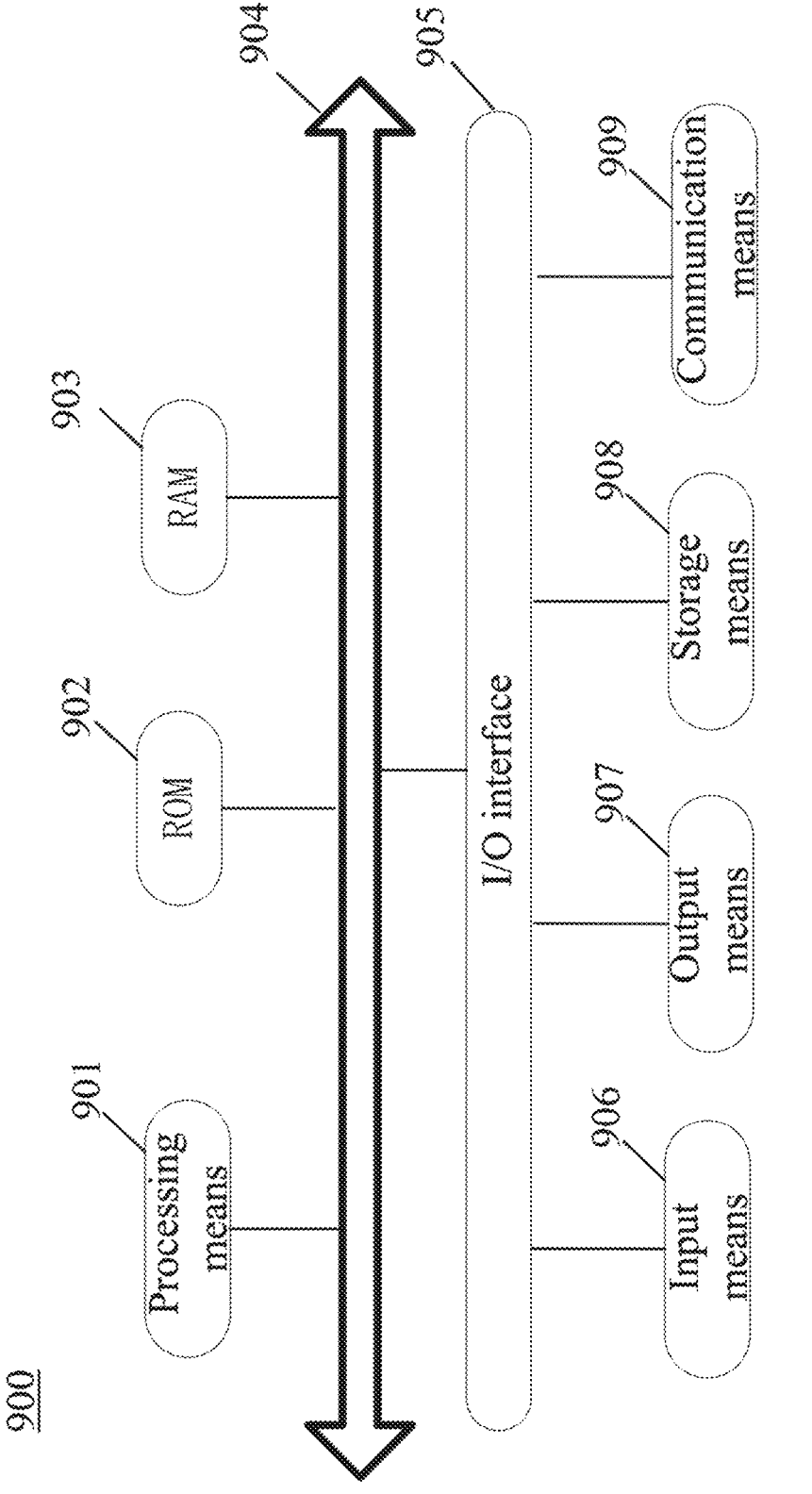
FIG. 10 is a schematic diagram of a hardware structure of an electronic device provided by an embodiment of the present disclosure.

Referring to FIG. 10, a schematic structural diagram of an electronic device 900 suitable for implementing embodiments of the present disclosure is shown. The electronic device 900 can be a terminal device or a media library. The terminal device may include, but is not limited to, a mobile phone, a laptop, a digital broadcast receiver, a personal digital assistant (Personal Digital Assistant, PDA for short), a portable android device (Portable Android Device, PAD for short), a portable media player (Portable Media Player, PMP for short), a vehicle-mounted terminal (e.g., a vehicle-mounted navigation terminal), a mobile terminal such as a wearable electronic device, and a fixed terminal such as a digital TV (Television), a desktop computer and a smart home device. The electronic device shown in FIG. 10 is merely an embodiment, and shall not impose any limitation on the functions and use scope of the embodiments of the present disclosure.

As shown in FIG. 10, the electronic device 900 can include a processing means 901 for performing an image processing method (e.g., a central processing unit, a graphics processor, or the like), which can perform various appropriate actions and processes in accordance with a program stored in a read only memory (Read Only Memory, ROM for short) 902 or loaded from a storage means 908 into a random access memory (Random Access Memory, RAM for short) 903. In the RAM 903, various programs and data required for the operation of the electronic device 900 are also stored. The processing means 901, the ROM 902, and the RAM 903 are connected to each other through a bus 904. An input/output (Input/Output, I/O for short) interface 905 is also connected to the bus 904.

In general, the following means may be connected to the I/O interface 905: an input means 906 including, for example, a touch screen, a touch pad, a keyboard, a mouse, a camera, a microphone, an accelerometer, a gyroscope, etc.; an output means 907 including, for example, a liquid crystal display (Liquid Crystal Display, LCD for short), a speaker, a vibrator, etc.; a storage means 908 including, for example, a magnetic tape, a hard disk, etc.; and a communication means 909. The communication means 909 can enable the electronic device 900 to communicate wirelessly or in a wired manner with other devices to exchange data. While FIG. 10 illustrates an electronic device 900 with various means, it should be understood that it is not required that all of the illustrated means be implemented or provided. More or fewer means can alternatively be implemented or provided.

In particular, according to an embodiment of the present disclosure, the process described above with reference to the flowchart can be implemented as a computer software program. For example, an embodiment of the present disclosure includes a computer program product, including a computer program carried on a computer readable medium, where the computer program includes a program code for performing the method as shown in each flowchart according to the embodiment of the present disclosure. In such an embodiment, the computer program can be downloaded and installed from a network via the communication means 909, or installed from the storage means 908, or installed from the ROM 902. When the computer program is executed by the processing apparatus 901, the above-described functions defined in the method of embodiments of the present disclosure are executed.

It should be noted that the computer readable medium in the present disclosure can be a computer readable signal medium or a computer readable storage medium, or any combination thereof. A computer readable storage medium may be, for example, but not limited to, an electronic, magnetic, optical, electromagnetic, infrared, or semiconductor system, means or device, or any suitable combination of the foregoing. More specific examples of the computer readable storage medium may include, but are not limited to, an electrical connection having one or more wires, a portable computer diskette, a hard disk, random access memory (RAM), read-only memory (ROM), an erasable programmable read-only memory (Erasable Programmable Read-Only Memory, EPROM or Flash memory for short), an optical fiber, a portable compact disk read-only memory (Portable Compact Disk Read-Only Memory, CD-ROM for short), an optical storage device, a magnetic storage device, or any suitable combination of the foregoing. In the present disclosure, a computer readable storage medium may be any tangible medium that can contain or store a program for use by or in connection with an instruction execution system, means, or device. Furthermore, in the present disclosure, the computer readable signal medium may include a propagated data signal, which carries a computer readable program code, in baseband or as part of a carrier wave. Such a propagated signal may take any of a variety of forms, including, but not limited to electromagnetic signals, optical signals, or any suitable combination of the foregoing. A computer readable signal medium may also be any computer readable medium other than a computer readable storage medium, which can send, propagate, or transmit a program for use by or in connection with an instruction execution system, means, or device. The program code contained on the computer readable medium may be transmitted by means of any appropriate medium, including, but not limited to, wires, optical fiber cables, RF (Radio Frequency, Radio Frequency), etc., or any suitable combination of the foregoing.

The computer readable medium may be contained in the electronic device, or may exist separately without being assembled into the electronic device.

The computer readable medium carries one or more programs, which, when executed by the electronic device, cause the electronic device to execute the method shown in the foregoing embodiments.

The computer program code for executing the operations of the present disclosure may be written in one or more programming languages or combinations thereof, and the programming language includes an object-oriented programming language—such as Java, Smalltalk, C++, and also includes a conventional procedural programming language—such as a "C" language or similar programming language. The program code can be entirely executed on the user's computer, partially executed on the user's computer, executed as a stand-alone software package, partially executed on the user's computer and partially executed on a remote computer, or entirely executed on a remote computer or media library. In situations involving a remote computers, the remote computer can be connected to the user's computer through any type of network, including a local area network (Local Area Network, LAN for short) or wide area network (Wide Area Network, WAN for short), or can be connected to an external computer (for example, through the Internet using an Internet Service Provider).

The flowchart and block diagrams in the drawings illustrate the architecture, functions, and operations of possible implementations of systems, methods and computer program products according to various embodiments of the present disclosure. In this regard, each block in the flowcharts or block diagrams may represent a module, a program segment, or a part of code, which includes one or more execution instructions for implementing the specified logical functions. It should also be noted that in some alternative implementations, the functions indicated in the blocks may also occur in a different order than those indicated in the drawings. For example, two consecutive blocks can actually be executed in parallel, and sometimes they can also be executed in a reverse order, depending on the function involved. It should also be noted that each block in the block diagrams and/or flowcharts, and combinations of blocks in the block diagrams and/or flowcharts, can be implemented by means of dedicated hardware-based systems that perform specified functions or operations, or be implemented by means of combinations of dedicated hardware and computer instructions.

A unit involved in the embodiments of the present disclosure may be implemented through software or hardware. The name of the unit does not constitute a limitation to the unit itself in some cases, for example, the first acquisition unit may also be described as "a unit acquiring at least two Internet protocol addresses".

The functions described herein above may be performed, at least in part, by one or more hardware logic components.

For example, without limitation, exemplary types of hardware logic components that can be used include a field-programmable gate array (Field-Programmable Gate Array, FPGA for short), an application specific integrated circuit (Application Specific Integrated Circuit, ASIC for short), an application specific standard product (Application Specific Standard Product, ASSP for short), a system-on-a-chip (System-on-a-chip, SOC for short), a complex programmable logic device (Complex Programmable Logic Device, CPLD for short), etc.

In the context of the present disclosure, the machine readable medium can be a tangible medium that can contain or store a program for use by or in combination with an instruction execution system, means, or device. The machine readable medium can be a machine readable signal medium or a machine readable storage medium. The machine readable medium may include but is not limited to an electronic, magnetic, optical, electromagnetic, infrared, or semiconductor system, means, or device, or any suitable combination of the foregoing. More specific examples of the machine readable storage medium may include an electrical connection based on one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing.

The following are some embodiments of the present disclosure.

In a first aspect, according to one or more embodiments of the present disclosure, an image processing method includes:

obtaining a live-action shooting image;

determining a target object image in the live-action shooting image, where the target object image is an image containing a target object;

acquiring a displaying object associated with the target object;

determining, according to the target object image, a target displaying position of the displaying object in the live-action shooting image; and displaying the displaying object at the target displaying position in the live-action shooting image.

In an optional implementation, the determining a target object image in the live-action shooting image includes:

acquiring a reference image, where the reference image is the image containing the target object;

determining, according to the reference image, the target object image in the live-action shooting image.

In an optional implementation, the acquiring a reference image includes:

extracting a global feature of the live-action shooting image;

matching the global feature of the live-action shooting image with a global feature of at least one to-be-referenced image stored in an image database;

determining a to-be-referenced image matched with the feature of the live-action shooting image as the reference image.

In an optional implementation, the reference image includes a preset displaying position;

the determining, according to the target object image, a target displaying position of the displaying object in the live-action shooting image includes:

performing model adaptation on the target object image and the reference image, to determine the target displaying position of the displaying object in the live-action shooting image based on a preset displaying position in the reference image.

In an optional implementation, the performing model adaptation on the target object image and the reference image, to determine the target displaying position of the displaying object in the live-action shooting image based on a preset displaying position in the reference image includes:

determining, according to the reference image and the target object image, an image affine transformation matrix;

performing, according to the image affine transformation matrix, affine transformation on the preset displaying position in the reference image, to obtain the target displaying position of the displaying object in the live-action shooting image.

In an optional implementation, the determining, according to the reference image and the target object image, an image affine transformation matrix includes:

extracting a local feature of the target object image;

matching the local feature of the target object image with a local feature of the reference image, to obtain a mapping relationship between the local features;

determining, according to the mapping relationship between the local features, the image affine transformation matrix.

In an optional implementation, the reference image includes a reference coordinate point of the preset displaying position;

the performing, according to the image affine transformation matrix, affine transformation on the preset displaying position in the reference image, to obtain the target displaying position of the displaying object in the live-action shooting image includes:

performing, according to the image affine transformation matrix, affine transformation on the reference coordinate point, to obtain a transformed target reference coordinate point;

determining, according to the target reference coordinate point, the target displaying position of the displaying object in the live-action shooting image.

In an optional implementation, the reference coordinate point of the preset displaying position being included in the reference image is preset.

In an optional implementation, after determining the target object image in the live-action shooting image, the method further includes:

uploading the target object image to a server;

receiving the displaying object returned by the server, so as to display the displaying object.

In an optional implementation, the displaying the displaying object at the target displaying position in the live-action shooting includes:

based on an augmented reality display technology, displaying the displaying object, in a superimposition manner, at the target displaying position in the live-action shooting image.

In an optional implementation, the method further includes:

responding to a triggering operation by a user on the displaying object displayed in the live-action shooting image;

displaying a triggering result of the displaying object in the live-action shooting image.

In an optional implementation, the target object is a landmark building.

In an optional implementation, the method further includes:

displaying a landmark name of the landmark building in the live-action shooting image.

In a second aspect, according to one or more embodiments of the present disclosure, an image processing apparatus includes:

a shooting and displaying module, configured to obtain a live-action shooting image;

a recognition processing module, configured to determine a target object image in the live-action shooting image, where the target object image is an image containing a target object; the recognition processing module is further configured to acquire a displaying object associated with the target object, and determine, according to the target object image, a target displaying position of the displaying object in the live-action shooting image;

where the shooting and displaying module is further configured to display the displaying object at the target displaying position in the live-action shooting image.

In an optional implementation, when determining the target object image in the live-action shooting image, the recognition processing module is specifically configured to: acquire a reference image, where the reference image is the image containing the target object; and determine, according to the reference image, the target displaying object in the live-action shooting image.

In an optional implementation, when obtaining the reference image, the recognition processing module is specifically configured to: extract a global feature of the live-action shooting image; match the global feature of the live-action shooting image with a global feature of at least one to-be-referenced image stored in an image database; and determine a to-be-referenced image matched with the feature of the live-action shooting image as the reference image.

In an optional implementation, the reference image includes a preset displaying position;

when determining, according to the target object image, a target displaying position of the displaying object in the live-action shooting image, the recognition processing module is specifically configured to: perform model adaptation on the target object image and the reference image, to determine the target displaying position of the displaying object in the live-action shooting image based on a preset displaying position in the reference image.

In an optional implementation, when performing model adaptation on the target object image and the reference image, to determine the target displaying position of the displaying object in the live-action shooting image based on a preset displaying position in the reference image, the recognition processing module is specifically configured to: determine, according to the reference image and the target object image, an image affine transformation matrix; and perform, according to the image affine transformation matrix, affine transformation on the preset displaying position in the reference image, to obtain the target displaying position of the displaying object in the live-action shooting image.

In an optional implementation, when determining, according to the reference image and the target object image, an image affine transformation matrix, the recognition processing module is specifically configured to:

extract a local feature of the target object image; match the local feature of the target object image with a local feature of the reference image, to obtain a mapping relationship between the local features; and determine, according to the mapping relationship between the local features, the image affine transformation matrix.

In an optional implementation, the reference image includes a reference coordinate point of the preset displaying position;

when performing, according to the image affine transformation matrix, affine transformation on the preset displaying position in the reference image, to obtain the target displaying position of the displaying object in the live-action shooting image, the recognition processing module is specifically configured to:

perform, according to the image affine transformation matrix, affine transformation on the reference coordinate point, to obtain a transformed target reference coordinate point; and determine, according to the target reference coordinate point, the target displaying position of the displaying object in the live-action shooting image.

In an optional implementation, the reference coordinate point of the preset displaying position being included in the reference image is preset.

In an optional implementation, after determining a target object image in the live-action shooting image, the recognition processing module is further configured to: upload the target object image to a server; and receive the displaying object returned by the server so as to cause the shooting and displaying module to display the displaying object.

In an optional implementation, when displaying the displaying object at the target displaying position in the live-action shooting, the shooting and displaying module is specifically configured to:

based on an augmented reality display technology, display the displaying object, in a superimposition manner, at the target displaying position in the live-action shooting image.

In an optional implementation, the shooting and displaying module is further configured to: respond to a triggering operation by a user on the displaying object displayed in the live-action shooting image; and display a triggering result of the displaying object in the live-action shooting image.

In an optional implementation, the target object is a landmark building.

In an optional implementation, the shooting and displaying module is further configured to display a landmark name of the landmark building in the live-action shooting image.

In a third aspect, according to one or more embodiments of the present disclosure, an electronic device includes:

at least one processor; and a memory;

where the memory stores computer execution instructions;

the at least one processor executes the computer execution instructions stored in the memory, causing the at least one processor to perform the method according to any one of the foregoing.

In a fourth aspect, according to one or more embodiments of the present disclosure, a computer readable storage medium, where the computer readable storage medium stores therein computer execution instructions, when the computer execution instructions are executed by a processor, the method according to any one of the foregoing is implemented.

In a fifth aspect, according to one or more embodiments of the present disclosure, a computer program product includes computer instructions, where when the computer instructions are executed by a processor, the method according to any one of the foregoing is implemented.

In a sixth aspect, according to one or more embodiments of the present disclosure, a computer program, where when the computer program is executed by a processor, the method according to any one of foregoing is implemented.

The above description is merely illustrative of the preferred embodiments of the present disclosure and of the technical principles employed. A person skilled in the art should understand that the scope involved in the present disclosure is not limited to the technical solution formed by the specific combination of the described technical features, and should also cover other technical solutions formed by any combination of the described technical features or equivalent features thereof without departing from the described concept, for example, a technical solution formed by replacing the described features with technical features having similar functions disclosed in the present disclosure (but not limited thereto).

In addition, while operations are depicted in a particular order, this should not be understood as requiring that the operations be performed in the particular order shown or in a sequential order. In certain environments, multitasking and parallel processing may be advantageous. Likewise, while several specific implementation details are included in the above discussion, these should not be construed as limiting the scope of the present disclosure. Some features described in the context of individual embodiments can also be implemented in combination in a single embodiment. Conversely, various features described in the context of a single embodiment can also be implemented individually or in any suitable subcombination in multiple embodiments.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

What is claimed is:

1. An image processing method, comprising:
obtaining a live-action shooting image;
determining a target object image in the live-action shooting image, wherein the target object image is an image containing a target object;
acquiring a displaying object associated with the target object;
determining, according to the target object image, a target displaying position of the displaying object in the live-action shooting image; and
displaying the displaying object at the target displaying position in the live-action shooting image, wherein
the determining a target object image in the live-action shooting image comprises:
acquiring a reference image, wherein the reference image is an image that is preset in an image database and includes a standard image of the target object; and
determining, by performing feature matching on a feature of the live-action shooting image and a feature of the reference image, the target object image in the live-action shooting image,
the reference image comprises a preset displaying position,
the determining, according to the target object image, a target displaying position of the displaying object in the live-action shooting image comprises:

performing model adaptation on the target object image and the reference image, to determine the target displaying position of the displaying object in the live-action shooting image based on the preset displaying position in the reference image, and
the preset displaying position is a displaying position of the displaying object associated with the target object in the reference image.

2. The image processing method according to claim 1, wherein the acquiring a reference image comprises:
extracting a global feature of the live-action shooting image;
matching the global feature of the live-action shooting image with a global feature of at least one to-be-referenced image stored in the image database; and
determining a to-be-referenced image matched with the global feature of the live-action shooting image as the reference image.

3. The image processing method according to claim 1, wherein the performing model adaptation on the target object image and the reference image, to determine the target displaying position of the displaying object in the live-action shooting image based on the preset displaying position in the reference image comprises:
determining, according to the reference image and the target object image, an image affine transformation matrix; and
performing, according to the image affine transformation matrix, affine transformation on the preset displaying position in the reference image, to obtain the target displaying position of the displaying object in the live-action shooting image.

4. The image processing method according to claim 3, wherein the determining, according to the reference image and the target object image, an image affine transformation matrix comprises:
extracting a local feature of the target object image;
matching the local feature of the target object image with a local feature of the reference image, to obtain a mapping relationship between the local features; and
determining, according to the mapping relationship between the local features, the image affine transformation matrix.

5. The image processing method according to claim 3, wherein
the reference image comprises a reference coordinate point of the preset displaying position, and
the performing, according to the image affine transformation matrix, affine transformation on the preset displaying position in the reference image, to obtain the target displaying position of the displaying object in the live-action shooting image comprises:
performing, according to the image affine transformation matrix, affine transformation on the reference coordinate point, to obtain a transformed target reference coordinate point; and
determining, according to the target reference coordinate point, the target displaying position of the displaying object in the live-action shooting image.

6. The image processing method according to claim 1, wherein after determining a target object image in the live-action shooting image, the method further comprises:
uploading the target object image to a server; and
receiving the displaying object returned by the server, so as to display the displaying object.

7. The image processing method according to claim 1, wherein the displaying the displaying object at the target displaying position in the live-action shooting image comprises:

based on an augmented reality display technology, displaying the displaying object, in a superimposition manner, at the target displaying position in the live-action shooting image.

8. The image processing method according to claim 1, further comprising:

responding to a triggering operation by a user on the displaying object displayed in the live-action shooting image; and displaying a triggering result of the displaying object in the live-action shooting image.

9. The image processing method according to claim 1, wherein the target object is a landmark building.

10. The image processing method according to claim 9, further comprising:

displaying a landmark name of the landmark building in the live-action shooting image.

11. An electronic device, comprising:

at least one processor; and a memory for storing a computer program; wherein when the computer program is executed by the at least one processor, the at least one processor is configured to:

obtain a live-action shooting image;

determine a target object image in the live-action shooting image, wherein the target object image is an image containing a target object;

acquire a displaying object associated with the target object;

determine, according to the target object image, a target displaying position of the displaying object in the live-action shooting image; and display the displaying object at the target displaying position in the live-action shooting image, wherein when determining the target object image in the live-action shooting image, the at least one processor is further configured to:

acquire a reference image, wherein the reference image is an image that is preset in an image database and includes a standard image of the target object; and determine, by performing feature matching on a feature of the live- action shooting image and a feature of the reference image, the target object image in the live-action shooting image, the reference image comprises a preset displaying position, when determining, according to the target object image, a target displaying position of the displaying object in the live-action shooting image, the at least one processor is further configured to:

perform model adaptation on the target object image and the reference image, to determine the target displaying position of the displaying object in the live-action shooting image based on the preset displaying position in the reference image, and the preset displaying position is a displaying position of the displaying object associated with the target object in the reference image.

12. The electronic device according to claim 11, wherein the at least one processor is configured to:

upload the target object image to a server; and receive the displaying object returned by the server, so as to display the displaying object.

13. The electronic device according to claim 11, wherein the at least one processor is configured to:

respond to a triggering operation by a user on the displaying object displayed in the live-action shooting image; and display a triggering result of the displaying object in the live-action shooting image.

14. A non-transitory computer readable storage medium, wherein the computer readable storage medium stores therein computer execution instructions, and when the computer execution instructions are executed by a processor, the processor is configured to:

obtain a live-action shooting image;

determine a target object image in the live-action shooting image, wherein the target object image is an image containing a target object;

acquire a displaying object associated with the target object;

determine, according to the target object image, a target displaying position of the displaying object in the live-action shooting image; and display the displaying object at the target displaying position in the live-action shooting image, wherein when determining the target object image in the live-action shooting image, the at least one processor is further configured to:

acquire a reference image, wherein the reference image is an image that is preset in an image database and includes a standard image of the target object; and determine, by performing feature matching on a feature of the live-action shooting image and a feature of the reference image, the target object image in the live-action shooting image, the reference image comprises a preset displaying position, when determining, according to the target object image, a target displaying position of the displaying object in the live-action shooting image, the processor is further configured to:

perform model adaptation on the target object image and the reference image, to determine the target displaying position of the displaying object in the live-action shooting image based on the preset displaying position in the reference image, and the preset displaying position is a displaying position of the displaying object associated with the target object in the reference image.

* * * * *